United States Patent
Chisholm et al.

(10) Patent No.: US 6,468,684 B1
(45) Date of Patent: Oct. 22, 2002

(54) PROTON CONDUCTING MEMBRANE USING A SOLID ACID

(75) Inventors: Calum Chisholm, Pasedena; Sekharipuram R. Narayanan, Altadena; Dane Boysen, Caltech; Sossina M. Haile, Altadena, all of CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/439,377

(22) Filed: Nov. 15, 1999

Related U.S. Application Data

(60) Provisional application No. 60/116,741, filed on Jan. 22, 1999, provisional application No. 60/146,946, filed on Aug. 2, 1999, provisional application No. 60/146,943, filed on Aug. 2, 1999, and provisional application No. 60/151,811, filed on Aug. 30, 1999.

(51) Int. Cl.[7] .......................... H01M 8/10; C25B 13/04; B01D 71/02; C01B 13/00; H01B 1/00
(52) U.S. Cl. .............................. 429/33; 204/295; 95/55; 252/500; 423/326; 423/641
(58) Field of Search .......................... 429/33; 423/512.1, 423/592, 641, 326; 252/184, 500; 204/295; 95/55; 96/4

(56) References Cited

U.S. PATENT DOCUMENTS

| | | | |
|---|---|---|---|
| 4,659,559 A | | 4/1987 | Struthers ...................... 429/46 |
| 4,985,315 A | * | 1/1991 | Lemoine ....................... 429/33 |
| 5,344,548 A | * | 9/1994 | Alberti et al. ............... 204/424 |
| 5,436,094 A | * | 7/1995 | Horimoto et al. ............ 429/254 |
| 5,559,638 A | | 9/1996 | Aoki et al. ................... 359/749 |
| 5,573,648 A | * | 11/1996 | Shen et al. ................... 204/412 |
| 5,576,115 A | * | 11/1996 | Capuano et al. ............. 252/62.2 |
| 5,591,545 A | * | 1/1997 | Miyashita et al. ........... 429/218 |
| 5,766,799 A | * | 6/1998 | Hong ........................... 429/218 |
| 6,001,507 A | * | 12/1999 | Ono et al. .................... 429/217 |
| 6,059,943 A | * | 5/2000 | Murphy et al. .............. 204/296 |

FOREIGN PATENT DOCUMENTS

| | | |
|---|---|---|
| DE | 31 10 571 A1 * | 9/1982 |
| EP | 818841 A1 * | 1/1998 |

OTHER PUBLICATIONS

Politova, T. I., et al., "Ethylene Hydrogenation in Electrochemical Cell with Solid Proton–Conducting Electrolyte", Reaction Kinetics and Catalysis Letters, 41 (2), 1990, pp. 321–326.*

Haile, S.M., et al., "X–ray Diffraction Study of Cs5(HSO4)3(H2PO4)2, a New Solid Acid with a Unique Hydrogen–Bond Network", Journal of Solid State Chemistry 140 (2), 1998, pp. 251–265.*

Haile, S.M., et al., "Superprotonic Conductivity in Cs3(HSO4)2(H2PO4)", Solid State Ionics 77 (1995), pp. 128–134.*

(List continued on next page.)

*Primary Examiner*—Patrick Ryan
*Assistant Examiner*—Jonathan Crepeau
(74) *Attorney, Agent, or Firm*—Fish & Richardason P.C.

(57) ABSTRACT

A solid acid material is used as a proton conducting membrane in an electrochemical device. The solid acid material can be one of a plurality of different kinds of materials. A binder can be added, and that binder can be either a nonconducting or a conducting binder. Nonconducting binders can be, for example, a polymer or a glass. A conducting binder enables the device to be both proton conducting and electron conducting. The solid acid material has the general form $M_a H_b (XO_t)_c$.

11 Claims, 2 Drawing Sheets

OTHER PUBLICATIONS

Haile, S.M., "Hydrogen–Bonding and Phase Transitions in Proton–Conducting Solid Acids", Mat. Res. Soc. Symp. Proc. 547 (1999), pp. 315–326.*

Mhiri, T., "Hydrogen Bonding in Cs1–xMxHSO4 Protonic Conductors", Solid State Ionics 61 (1–3) 1993, pp. 187–191.*

Hawley's Condensed Chemical Dictionary, 13$^{th}$ ed., 1997 (no month), entry of "pore," p. 910.*

Zaidi, S. M. J., et al., "Solid Polymer Composite Electrolytes for PEMFC," Proc. Intersoc. Energy Convers. Eng. Conf. 33, 1998.*

* cited by examiner

PROTON CONDUCTING MEMBRANE USING A SOLID ACID

CROSS-REFERENCE TO RELATED APPLICATIONS

This application claims benefit of U.S. Provisional Applications, Ser. No. 60/116,741, filed Jan. 22, 1999; Ser. No. 60/146,946, filed Aug. 2, 1999; Ser. No. 60/146,943, filed Aug. 2, 1999 and Ser. No. 60/151,811, filed Aug. 30, 1999.

STATEMENT AS TO FEDERALLY-SPONSORED RESEARCH

The invention described herein was made in the performance of work under a NASA contract, and is subject to the provisions of Public Law 96-517 (U.S.C. 202) in which the Contractor has elected to retain title.

FIELD

The present application describes a proton conducting membrane formed using an solid acid in its solid phase. More specifically, the present application teaches a proton conducting membrane, formed using an solid acid mixed with a supporting binder material, that is impermeable to fluids such as gas and water, can operate without hydration, and has high proton conductivity.

BACKGROUND

Proton conducting materials have a number of applications. Proton conducting membranes are widely utilized in devices which use a chemical reaction to produce or store electricity, or use electricity to drive a chemical process. Materials which conduct both protons and electrons ("mixed proton and electron conductors") are utilized in related applications.

Electrochemical devices depend on the flow of protons, or the flow of both protons and electrons through a proton conducting membrane. Exemplary electrochemical devices include a fuel cell, an electrolysis cell, a hydrogen separation cell, a battery, a supercapacitor, and a membrane reactor. There are other electrochemical devices which also use a proton conducting membrane.

An important use for proton conducting membranes is in fuel cells. Fuel cells are attractive alternatives to combustion engines for the generation of electricity because of their higher efficiency and the lower level of pollutants they produce. A fuel cell generates electricity from the electrochemical reaction of a fuel e.g. methane, methanol, gasoline, or hydrogen, with oxygen normally obtained from air.

There are three common types of fuel cells used at temperatures close to ambient. A direct hydrogen/air fuel cell system stores hydrogen and then delivers it to the fuel cell as needed.

In an indirect hydrogen/air fuel cell, hydrogen is generated on site from a hydrocarbon fuel, cleaned it of carbon monoxide (CO), and subsequently fed to the fuel cell.

A direct methanol fuel cell ("DMFC"), feeds methanol/water solution directly to the fuel cell, e.g., without any fuel processing. One type of DMFC has been described, for example, in U.S. Pat. No. 5,559,638. There are various advantages and disadvantages inherent within all three configurations. All are, to a greater or lesser extent, limited by the performance of the proton conducting membrane.

Nafion™, a perfluorinated sulphonic acid polymer, is often used as a membrane material for fuel cells which operate at temperatures close to ambient. Other hydrated polymers have also been used as proton conductive materials. Membranes of modified perfluorinated sulfonic acid polymers, polyhydrocarbon sulfonic acid polymers, and composites thereof are also known. These and related polymers are used in hydrated form. Proton transport occurs by the motion of hydronium ions, $H_3O^+$. Water is necessary in order to facilitate proton conduction. Loss of water immediately results in degradation of the conductivity. Moreover, this degradation is irreversible—a simple reintroduction of water to the system does not restore the conductivity. Thus, the electrolyte membranes of these hydrated polymer-based fuel cells must be kept humidified during operation. This introduces a host of balance-of-plant needs for water recirculation and temperature control.

A second limitation derives from the need to maintain water in the membrane. In order to maintain hydration, the temperature of operation cannot exceed 100° C. without cell pressurization. High temperature operation could be desirable, however, to increase catalyst efficiency in generating protons at the anode (in both $H_2$ and direct methanol fuel cells) and to improve catalyst tolerance to carbon monoxide ("CO"). CO is often present in the fuel that is used in the fuel cells. The CO can poison the precious metal catalysts. This is particularly problematic in indirect hydrogen/air fuel cells for which hydrogen is generated on site. High temperatures also benefit the reduction reaction on the cathode.

Another limitation of hydrated polymer electrolytes occurs in applications in methanol fuel cells. These polymers can be permeable to methanol. Direct transport of the fuel (i.e. methanol) across the membrane to the air cathode results in losses in efficiency.

Alternate proton conducting materials, which do not require humidification, which can be operated at slightly elevated temperatures, and/or which are impermeable to methanol, are desirable for fuel cell applications.

In the field of hydrogen separation, a proton conducting membrane is utilized to separate hydrogen from other gases such as CO and/or $CO_2$. Palladium is often used for this application. Palladium is permeable to molecular hydrogen, but not in general to other gases. There are drawbacks to the use of this material. It is expensive and the hydrogen diffusion rate is low. It would be desirable to develop new materials which are less expensive and exhibit higher proton/hydrogen transport rates.

In general, materials utilized in other electrochemical devices such as electrolysis cells, batteries, supercapacitors, etc., include liquid acid electrolytes, which are highly corrosive, and solid polymer proton conductors, which require humidification or exhibit insufficient proton conductivity. High conductivity, high chemical and thermal stability solid membranes with good mechanical properties are desirable for all of these applications.

SUMMARY

The present specification defines a new kind of material for a proton conducting membrane. Specifically, a proton conducting material is formed using an solid acid. The solid acid can be of the general form $M_aH_b(XO_t)_c$ or $M_aH_b(XO_t)_c \cdot nH_2O$, where:

M is one or more of the species in the group consisting of Li, Be, Na, Mg, K, Ca, Rb, Sr, Cs, Ba, Tl and $NH_4^+$ or $Cu^+$;

X is one or more of the species in the group consisting of Si, P, S, As, Se, Te, Cr and Mn; and a, b, c, n and t are rational numbers.

Solid acids do not rely on the presence of hydronium ions for proton transport, thus they do not require hydration for use as proton conductors.

A preferred solid acid used according to this specification is a solid phase solid acid that exhibits a superprotonic phase, a phase in which the solid has disorder in its crystal structure and a very high proton conductivity.

An embodiment uses a structural binder or matrix material to enhance the mechanical integrity and/or chemical stability of the membrane. That structural binder can be many different kinds of materials in the different embodiments. In particular, the structural binder can be a polymer, a ceramic, or an oxide glass.

Another embodiment uses an electronically conducting material as a matrix. This creates a membrane which conducts both protons and electrons.

The resulting material can be used for a proton conducting material in a device that relies on the flow of protons or the flow of both protons and electrons across a membrane, herein an "electrochemical" device e.g. a fuel cell, a hydrogen separation membrane, or a electrolysis cell.

DETAILED DESCRIPTION

Figure 1:
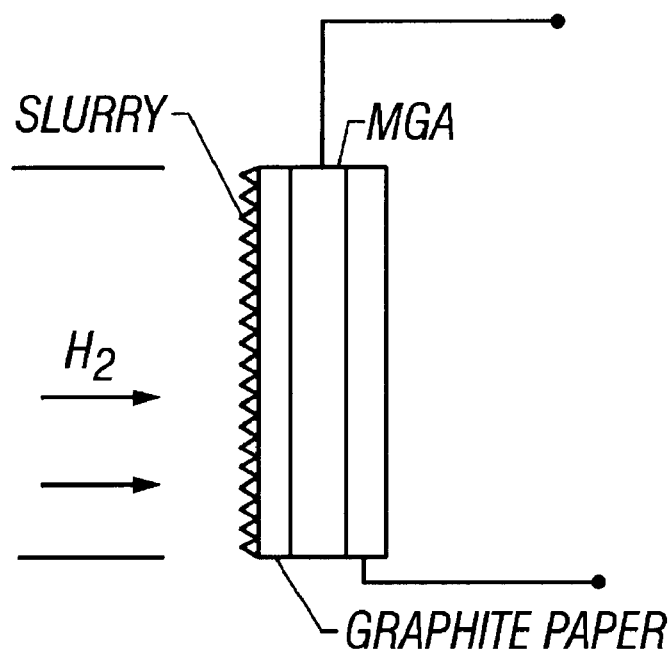
FIG. 1 shows an exemplary hydrogen/air fuel cell using an solid acid supported by a binder as its proton conducting membrane.

The present application teaches using an solid acid as a proton conducting membrane.

A solid acid can be of the general form $M_aH_b(XO_t)_c \cdot nH_2O$, where:

M is one or more of the species in the group consisting of Li, Be, Na, Mg, K, Ca, Rb, Sr, Cs, Ba, Ti and $NH_4^+$;

X is one or more of the species in the group consisting of Si, P, S, As, Se, Te, Cr and Mn; and a, b, c, n and t are rational numbers; with t preferably being 3 or 4 and where $t \geq 0$.

The solid acids used herein are compounds, such as $CsHSO_4$, whose properties are intermediate between those of a normal acid, such as $H_2SO_4$, and a normal salt, such as $Cs_2SO_4$. In general, the chemical formula of the solid acids of the type used according to the present specification can be written as a combination of the salt and the acid.

In general, solid acids are comprised of oxyanions, for example $SO_4$, $SO_3$, $SeO_4$, $SeO_3$, $SiO_4$, $PO_4$ or $AsO_4$, etc., which are linked together via O—H . . . O hydrogen bonds. The structure may contain more than one type of $XO_4$ or $XO_3$ group, and may also contain more than one type of M species.

Certain solid acids are solid materials at room temperature.

Many different solid acids are contemplated by this specification. One example of a material that can be used as the solid acid is $CsHSO_4$, which is intermediate between $Cs_2SO_4$ (a normal salt) and $H_2SO_4$ (a normal acid). In this case, the solid acid can be written as $0.5\ Cs_2SO_4 * 0.5\ H_2SO_4$. Another example, using the same salt and the same acid, is $1.5\ Cs_2SO_4 * 0.5\ H_2SO_4$, to give $Cs_3H(SO_4)_2$.

Other examples are:

$CsH_2PO_4$, $Cs_5(HSO_4)_3(H_2PO_4)_2$, $Cs_2(HSO_4)(H_2PO_4)$, $Cs_3(HSO_4)_2(H_2PO_4)$, $Cs_3(HSO_4)_2(H_{1.5}(S_{0.5}P_{0.5})O_4)$, $Cs_5H_3(SO_4)_4 \cdot xH_2O$, $TlHSO_4$, $CsHSeO_4$, $Cs_2(HSeO_4)(H_2PO_4)$, $Cs_3H(SeO_4)_2$ $(NH_4)_3H(SO_4)_2$, $(NH_4)_2(HSO_4)(H_2PO_4)$, $Rb_3H(SO_4)_2$, $Rb_3H(SeO_4)_2$, $Cs_{1.5}Li_{1.5}H(SO_4)_2$, $Cs_2Na(HSO_4)_3$, $TlH_3(SeO_3)_2$, $CsH_2AsO_4$ $(NH_4)_2(HSO_4)(H_2AsO_4)$, $CaNaHSiO_4$.

The preferred material for any specific electrochemical device depends on the application. For example, $Cs_2(HSO_4)(H_2PO_4)$ may be preferred for electrochemical devices where high conductivity is critical. $(NH_4)_3H(SO_4)_2$ may be preferred where low cost is critical. $CaNaHSiO_4$ may be preferred where chemical stability is critical.

Solid acids have certain characteristics that can be advantageous when used as a proton conducting membrane. The proton transport process does not rely on the motion of hydronium ions, thus solid acids need not be humidified and their conductivity is substantially independent of humidity. Another advantage is that solid acids are generally stable against thermal decomposition at elevated temperatures. The thermal decomposition temperature for some of the solid acids described in this specification, e.g., $CaNaHSiO_4$, can be as high as 350° C.

Since solid acids need not be humidified, solid acid based membranes can be operated at elevated temperatures, e.g. temperatures above 100° C.

The conductivity of solid acids may be made purely protonic, or both electronic and protonic depending on the choice of the X element in the chemical formula $M_aH_b(XO_4)_c \cdot nH_2O$ or $M_aH_b(XO_3)_c \cdot nH_2O$. That is, by using a given amount of a variable valence element such as Cr or Mn for X, the solid acid can be made to conduct electrons as well as protons.

Another advantage is caused by the structure of the solid acids themselves. Since solid acids are dense, inorganic materials, they are impermeable to gases and other fluids that may be present in the electrochemical environment, e.g., gases and hydrocarbon liquids.

The materials are also relatively inexpensive.

This combination of properties: good conductivity in dry environments, conductivity which can be controlled to be either purely proton conducting or both electron and proton conducting, impermeability to gases and hydrocarbon liquids, serviceability at elevated temperatures, e.g. temperatures over 100° C. and relatively low cost, render solid acids as useful materials for use as membranes in electrochemical devices.

Solid acids exhibit another advantageous property for applications in proton conducting membranes. Under certain conditions of temperature and pressure, the crystal structure of a solid acid can become disordered. Concomitant with this disorder is an high conductivity, as high as $10^{-3}$ to $10^{-2}$ $\Omega^{-1}cm^{-1}$. Because of the high proton conductivity of the structurally disordered state, it is known as a superprotonic phase. The proton transport is believed to be facilitated by rapid $XO_4$ or $XO_3$ group reorientations, which occur because of the disorder.

Many solid acids enter a superprotonic state at a temperature between 50 and 150° C. at ambient pressures. The transition into the superprotonic phase may be either sharp or gradual. The superprotonic phase is marked by an increase in conductivity, often by several orders of magnitude. At temperatures above the transition temperature, the solid acid is superprotonic and retains its high proton conductivity until the decomposition or melting temperature is reached.

Solid acids that undergo a superprotonic transition include:

CsHSO$_4$, Cs$_2$(HSO$_4$)(H$_2$PO$_4$), Cs$_3$(HSO$_4$)$_2$(H$_2$PO$_4$), Cs$_3$(HSO$_4$)$_2$(H$_{1.5}$(S$_{0.5}$P$_{0.5}$)O$_4$), Cs$_5$H$_3$(SO$_4$)$_4$·xH$_2$O, CsHSeO$_4$, Cs$_3$H(SeO$_4$)$_2$, (NH$_4$)$_3$H(SO$_4$)$_2$, Rb$_3$H(SeO$_4$)$_2$.

The superprotonic phases of solid acids have increased conductivity. An interesting embodiment is a solid acid operated at a temperature above the superprotonic transition temperature, and below the decomposition or melt temperature.

Despite the many advantageous properties of solid acids, problems can be encountered in trying to implement them in electrochemical devices because many solid acids are water soluble. They can also be difficult to process into large area membranes, and they often have poor mechanical properties. Some solid acids, such as CaNaHSiO$_4$ and other silicates, are not soluble in water.

Because of these difficulties, a disclosed embodiment includes a composite comprised of an solid acid embedded in a supporting matrix. The solid acid part of the composite provides the desired electrochemical activity, whereas the matrix provides mechanical support and also may increase chemical stability. Different materials are contemplated herein for use as the supporting matrix.

In light of the properties of solid acids outlined above, the preferred embodiment is a composite material comprised of a solid acid embedded in a supporting matrix and operated at a slightly elevated temperature. In such a composite, the solid acid is in its superprotonic phase, exhibits high conductivity, and provides the desired electrochemical functions; the support matrix may provide mechanical support, and it may also serve to protect the solid acid from water in the environment. A high temperature of operation can render the solid acid into its superprotonic state. A high temperature of operation can also ensure that any water present in the electrochemical device will be present in the form of steam rather than liquid water, making the H$_2$O less likely to attack the solid acid.

Hydrogen/Air Fuel Cells

A hydrogen/air fuel cell is shown in FIG. 1, in which the proton conducting membrane is a solid acid/matrix composite of the type described herein. Because the membrane need not be humidified, the fuel cell system can be simpler than one which uses a hydrated polymer membrane. The humidification system normally required for fuel cell utilizing a Nafion or related polymer membrane can be eliminated in FIG. 1. Hence, less rigid temperature monitoring and control may be used in the solid acid based system as compared with Nafion based fuel cell systems. These differences allow a less-costly fuel cell system.

Because the membrane need not be humidified, the fuel cell shown in FIG. 1 can be operated at temperatures above 100° C. The tolerance of the Pt/Ru catalysts to carbon monoxide CO poisoning increases with increasing temperature. Thus, a fuel cell such as shown in FIG. 1, operated at a temperature above 100° C. may withstand higher concentrations of CO in the hydrogen fuel than a Nafion based fuel cell which is typically operated at a temperature lower than 100° C.

The high temperature of operation also enhances the kinetics of the electrochemical reactions, and can thereby result in a fuel cell with higher overall efficiency than one based on Nafion or other hydrated polymers.

Direct Methanol Fuel Cells

Figure 2:
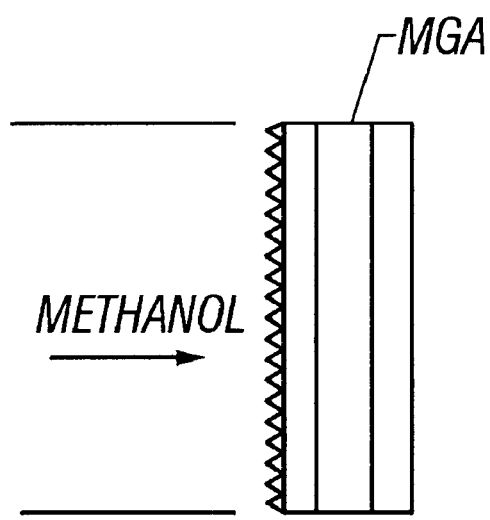
FIG. 2 shows an exemplary direct methanol fuel cell using an solid acid supported by a binder as its proton conducting membrane.

A direct methanol fuel cell is shown in FIG. 2. The proton conducting membrane is a solid acid/matrix composite of the type described herein. Because the membrane need not be humidified, the fuel cell system is much simpler and thus less costly than state of the art direct methanol fuel cell systems. The humidification system normally required for fuel cell utilizing a Nafion or related polymer membrane is eliminated in FIG. 2. Furthermore, temperature monitoring and control in the solid acid based system does not need to be as tight as in Nafion based fuel cell systems. Because the solid acid based membrane need not be humidified, the fuel cell may be operated at elevated temperatures. High temperatures can enhance the kinetics of the electrochemical reactions. This can result in a fuel cell with very high efficiency.

Another significant advantage of the fuel cell shown in FIG. 2 over state of the art direct methanol fuel cells results from the decreased permeability of the membrane to methanol. In state of the art direct methanol fuel cells, in which Nafion or another hydrated polymer serves as the membrane, methanol crossover through the polymeric membrane lowers fuel cell efficiencies. The impermeability of a solid acid membrane can improve this efficiency.

Hydrogen Separation Membranes

The Ru/Pt catalyst in a hydrogen/air fuel cell is sensitive to CO poisoning, particularly at temperatures close to ambient. Therefore, in an indirect hydrogen/air fuel cell, the hydrogen produced by the reformer is often cleaned, of e.g. CO to below 50 ppm, before it enters the fuel cell for electrochemical reaction.

Figure 3:
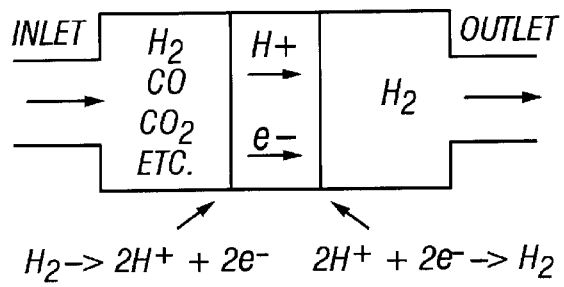
FIG. 3 shows a hydrogen separation membrane for the removal of CO and other gases from hydrogen.

In FIG. 3, a hydrogen separation membrane is shown for the removal of CO and other gases from hydrogen. The hydrogen separation membrane is made of a mixed proton and electron conducting membrane, as described herein. Hydrogen gas, mixed with other undesirable gases, is introduced onto one side of the membrane. Clean hydrogen gas is extracted from the other side of the membrane.

On the inlet side of the membrane, hydrogen gas is dissociated into H+ and e−. Because the membrane is both proton conducting and electron conducting, both of these species can migrate through the membrane. However, the membrane is substantially impermeable to other gases and fluids. Hence, CO and other undesirable gases or fluids cannot so migrate. On the outlet side of the membrane, the H+ and e− recombine to form hydrogen gas. The overall process is driven by the hydrogen chemical potential gradient, which is high on the inlet side of the membrane and low on the outlet side of the membrane.

Figure 4:
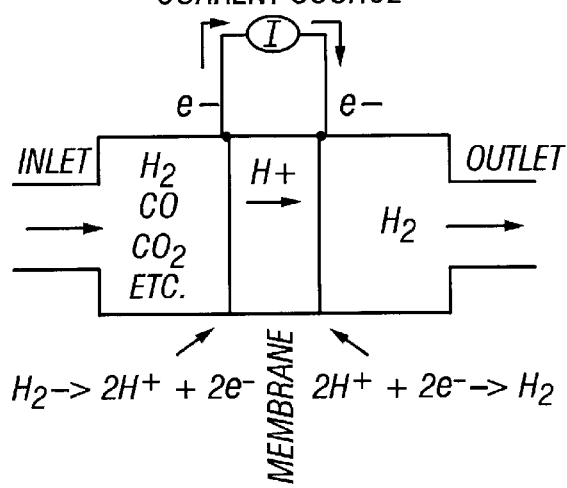
FIG. 4 shows another type of hydrogen separation membrane made of a proton conducting composite.

Another type of hydrogen separation membrane is shown in FIG. 4. The membrane is made of a proton conducting composite of the type described herein, and is connected to a current source. Hydrogen gas, mixed with other undesirable gases, is introduced onto one side of the membrane and clean hydrogen gas is extracted from the other side of the membrane. Application of a current causes the hydrogen gas to dissociate into H+ and e−. Because the membrane conducts only protons, these protons are the only species which can migrate through the membrane. The electrons migrate through the current source to the outlet side of the membrane, where the H+ and e− recombine to form hydrogen gas. The membrane is substantially impervious to other gases and fluids. Hence, CO and other undesirable gases or fluids cannot migrate through the proton conducting membrane. The overall process is driven by electric current applied via the current source.

Membrane Reactors

Figure 5:
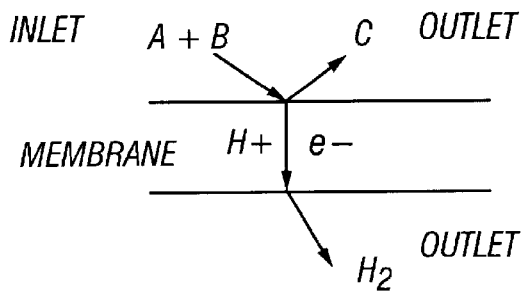
FIGS. 5 and 6 show a membrane reactor.

In FIG. 5 a membrane reactor is shown, in which a mixed proton and electron conducting membrane of the type described herein is utilized. The general reaction is that reactants A+B react to form products C+D, where D is hydrogen gas. Use of a mixed proton and electron conducting membrane in this reactor can enhance the reaction to give yields that exceed thermodynamic equilibrium values. On the inlet side of the membrane reactor, the reactants form products C+H2. Under equilibrium conditions, the hydrogen concentration builds up and the forward reaction is slowed. With the use of the mixed hydrogen and electron conducting membrane, the hydrogen is immediately extracted from the reaction region via transport through the membrane, and the forward reaction is enhanced. Examples of reactions in which yield could be enhanced by using such a membrane reactor include (1) the steam reformation of methane (natural gas) to produce syngas: CH4+H20→CO+3H2; (2) the steam reformation of CO to produce CO2 and H2: CO+H20→CO2+H2; (3) the decomposition of H2S to H2 and S, (4) the decomposition of NH3 to H2 and N2; (4) the dehydrogenation of propane to polypropylene; and (5) the dehydrogenation of alkanes and aromatic compounds to various products.

Figure 6:
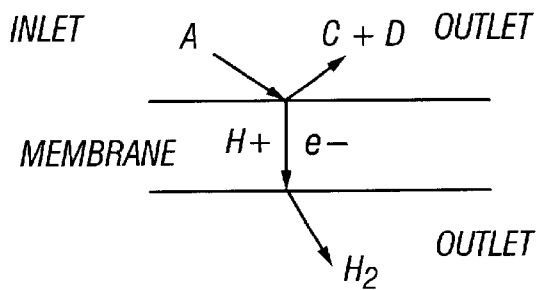

In FIG. 6 a second type of membrane reaction is shown, again, utilizing a mixed proton and electron conducting membrane of the type described herein. In this case, the general reaction is that the reactants A+B form the products C+D, where B is hydrogen. The hydrogen enters the reaction region via transport through the mixed conducting membrane, whereas the reactant A is introduced at the inlet to the membrane reactor, and is mixed with other species. The manner in which the hydrogen is introduced into the reactant stream (through the membrane) ensures that only the reactant A, and none of the other species reacts with hydrogen. This effect is termed selective hydrogenation.

The mixed proton and electron conducting membranes described herein provide an advantage over state-of-the-art membranes in that the conductivity is high at temperatures as low as 100° C., and the membranes are relatively inexpensive. Selective hydrogenation at temperatures close to ambient may have particular application in synthesis of pharmaceutically important compounds which cannot withstand high temperatures.

According to a first class of materials, the solid acid is mixed with a supporting structure that is electrochemically unreactive, to form a composite. A first embodiment uses a solid acid mixed with a melt-processable polymer as the supporting matrix structure.

The solid acid (CHS) was prepared from aqueous solutions containing stoichiometric amounts of $CS_2CO_3$ and $H_2SO_4$. Crystalline $CsHSO_4$ and a small amount (~8 wt %) of the related compound $Cs_5H_3(SO_4)_4 \cdot xH_2O$ (which also exhibits superprotonic behavior) were obtained upon introduction of methanol into the solution. Composite membranes of the solid acid and poly(vinylidene fluoride) were prepared by simple melt-processing methods. The two components were lightly ground together then hot-pressed at 180° C. and 10 kpsi for 15 minutes. Volume ratios of CHS:PVDF from 100% $CsHSO_4$ to 100% PVDF were prepared in 10 vol % increments.

Another example of a composite contains a solid acid and a thermoset polymer, which can be mixed in with the solid acid in monomer or prepolymer form, and then polymerized in situ.

The solid acid (CHS) was prepared from aqueous solutions containing stoichiometric amounts of $Cs_2CO_3$ and $H_2SO_4$. Crystalline $CSHSO_4$ and a small amount (~8 wt %) of the related compound $Cs_5H_3(SO_4)_4 \cdot xH_2O$ (which also exhibits superprotonic behavior) were obtained upon introduction of methanol into the solution. Composite membranes of the solid acid and the polyester resin marketed under the name Castoglas by Buehler, Inc. were synthesized simply by lightly grinding the solid acid and pre-polymer together and then adding the polymerization/crosslinking catalyst. A material with a 50:50 volume ratio was prepared.

Another example of a thermoset polymer—solid acid composite comprises the solid acid $(NH_3)_3H(SO_4)_2$ and the polymer poly(dicyclopentadiene) or poly DCPD.

The solid acid, TAHS, was prepared from aqueous solutions of $(NH_4)_2SO_4$ and $H_2SO_4$. The solid acid was ground then mixed with the monomer dicyclopentadiene. The polymerization catalyst was introduced into the mixture, which was then poured onto a Teflon plate and pressed into a thin film. The film was cured at 100° C. for approximately 2 hours. Materials with 25 and 17 vol % TAHS were prepared.

Another method for preparing solid acid/polymer composites is suspension coasting. For this, $CsHSO_4$ was dissolved in a water/ethanol solution. The polymer PVDF was then dispersed into this solution. A composite membrane was formed by casting the suspension and allowing the solvents to evaporate. Composite membranes comprised of a solid acid and a non-polymeric matrix material, such as a ceramic or an oxide glass can be prepared in the following manner. The solid acid is synthesized form aqueous solution and the matrix material is synthesized separately. The two components are mixed and ground together. The mixture is then hot pressed, preferably at a temperature which causes the solid acid to melt and flow, to yield a dense composite membrane.

The nature of the chemical bonding in solid acids of general formula $M_aH_b(XO_4)_c \cdot nH_2O$ or $M_aH_b(XO_3)_c \cdot nH_2O$ where:

M is one or more of the species in the group consisting of Li, Be, Na, Mg, K, Ca, Rb, Sr, Cs, Ba, Tl and $NH_4^+$;

X is one or more of the species in the group consisting of Si, P, S, As, Se, and Te; and a, b, c, and n are rational numbers, and n can be zero.

leads to materials which are inherently poor conductors of electrons. These compounds can be used in devices which require both proton and electron transport directly through the membrane if a mechanism for electron transport is introduced.

The first approach for introducing electronic conductivity into solid acid based materials is to prepare a composite comprised of the solid acid and a second substance which has a high electronic conductivity. This second substance may be an electronically conducting polymer, such as poly (aniline), or a typical metal, such as aluminum or copper. Where the electronically conducting component is a metal, it may be advantageous to introduce a chemically and electrically inert polymer into the composite simply to serve as a binder and provide the membrane with good mechanical properties. The processing methods described above may be used to prepare such composite membranes.

The second approach for introducing electronic conductivity into solid acid based materials is to perform direct chemical substitutions with variable valence ions. For example, a portion of the sulfur in $CsHSO_4$ may be replaced by chromium, which can be present in an oxidation state of anywhere from 2+ to 6+. Similarly, manganese may be introduced on the sulfur site, as this ion exhibits valence states anywhere between 2+ and 7+. Chemical substitution may also be performed with respect to the cesium in a compound such as $CsHSO_4$. Large ions with variable valence, such as thallium, indium, lead and tin can be used for these substitutions. The solid acid so modified may be used in an electrochemical device directly, or may be combined with a supporting matrix material as described above.

In the FIG. 1 embodiment, a membrane-electrode assembly (MEA) is prepared from the CHS-PVDF composite film in which the solid acid to polymer volume ratio is 50:50. The electrodes are formed of graphite paper which is impregnated with a complex slurry of platinum powder, PVDF, the solid acid, and Nafion, suspended/dissolved in a water and isopropanol solution. After evaporation of the solvents, the electrodes so prepared are hot-pressed onto the composite membrane. The MEA is placed in a fuel cell test station at 140° C. and hydrogen is introduced at the anode and oxygen at the cathode. The open cell voltage (OCV) obtained in this manner was 0.88 V. The same type of MEA may also be used in the FIG. 2 embodiment.

EXAMPLES

Example 1

A Cs based solid acid such as $CsHSO_4$, $CsHSeO_4$ or $Cs_5H_3(SO_4)_4 \cdot xH_2O$ is ground and mixed with a melt-processable polymer binder, such as poly(vinylidene fluoride), and hot-pressed. The result forms a solid composite membrane which is proton conducting even in dry atmospheres. The composite membrane, being comprised of two components which are substantially impermeable to fluids, may be less permeable than Nafion™.

Example 2

A Cs based solid acid such as $Cs_3(HSO_4)_2(H_{1.5}(S_{0.5}P_{0.5})O_4)$, $Cs_3(HSO_4)_2(H_2PO_4)$, $Cs_5(HSO_4)_3(H_2PO_4)_2$ or $Cs_2(HSO_4)(H_2PO_4)$ is ground and mixed with a melt-processable polymer binder, such as poly(vinylidene fluoride), and hot-pressed. The result forms a solid composite membrane which is proton conducting even in dry atmospheres. The membrane is also less permeable to fluids than Nafion™.

Example 3

A $NH_4$ based solid acid such as $(NH_4)_3H(SO_4)_2$ or $(NH_4)_3H(SeO_4)_2$ is ground and mixed with a melt-processable polymer binder, such as Crystar 101 thermoplastic, and hot-pressed. The result forms a solid composite membrane which is proton conducting even in dry atmospheres. The membrane is less permeable to fluids than Nafion™ and is also less expensive.

Example 4

An solid acid silicate of general formula $M_aH_bSiO_4$, such as $CaNaHSiO_4$, $Cs_3HSiO_4$, $(NH_4)_3HSiO_4$, is used as a membrane. Some of these materials are water insoluble and may have sufficient structural integrity that a binder is not required in some applications.

Example 5

A Cs or $NH_4$ based solid acid, such as $CsHSO_4$, $Cs_2(HSO_4)(H_2PO_4)$, $Cs_5H_3(SO_4)_4 \cdot xH_2O$ or $(NH_4)_3H(SO_4)_2$ is the prepolymer of a resin such as "castoglas", a commercial product from Buehler, Inc. The polymerization/crosslinking catalyst is added to the mixture, and a solid composite membrane so formed. The in situ polymerization/crosslinking can lead to a higher impermeability than composites formed by melt-processing.

Example 6

A Cs or $NH_4$ based solid acid, such as $CsHSO_4$, $Cs_2(HSO_4)(H_2PO_4)$, $Cs_5H_3(SO_4)_4 \cdot xH_2O$ or $(NH_4)_3H(SO_4)_2$ is mixed with a monomer such as dicyclopentadiene. A polymerization catalyst is then added to the mixture, and a solid composite membrane comprised of the solid acid and poly(dicyclopentadiene) is formed. The in situ polymerization of the polymer can lead to a higher impermeability than composites formed by melt-processing. Use of a $NH_4$ based solid acid can result in an inexpensive membrane.

Example 7

A Cs or $NH_4$ based solid acid, such as $CSHSO_4$, $Cs_2(HSO_4)(H_2PO_4)$, $Cs_5H_3(SO_4)_4 \cdot xH_2O$ or $(NH_4)_3H(SO_4)_2$ is dissolved in water, and added to a suspension of an insoluble polymer such as poly(vinylidene fluoride) suspended in a fluid such as ethanol. The mixture is cast and the liquids (water and ethanol) allowed to evaporate. This procedure yields a composite membrane which is proton conducting even in dry atmospheres. The casting step can produce very thin membranes with thicknesses on the order of one hundred microns.

Example 8

A Cs or $NH_4$ based solid acid, such as $CsHSO_4$, $Cs_2(HSO_4)(H_2PO_4)$, $Cs_5H_3(SO_4)_4 \cdot xH_2O$ or $(NH_4)_3H(SO_4)_2$ is ground and mixed with a ceramic, such as $Al_2O_3$, or an oxide glass, such as amorphous $SiO_2$. The mixed powders are compressed by hot-pressing. The resulting composite membrane may be stable to higher temperatures than those in which the binder is a polymer.

Example 9

A Cs or $NH_4$ based solid acid, such as $CsHSO_4$, $Cs_2(HSO_4)(H_2PO_4)$, $Cs_5H_3(SO_4)_4 \cdot xH_2O$ or $(NH_4)_3H(SO_4)_2$ is dissolved in water. The solution is introduced into a porous membrane comprised of an inert binder such as Teflon™, $SiO_2$, or $Al_2O_3$. The water is allowed to evaporate, leaving the solid acid to fill the pores of the binder. The result is a composite membrane which is proton conducting even in dry atmospheres.

Example 10

A Cs or $NH_4$ based solid acid, such as $CsHSO_4$, $Cs_2(HSO_4)(H_2PO_4)$, $Cs_5H_3(SO_4)_4 \cdot xH_2O$ or $(NH_4)_3H(SO_4)_2$, which is only proton conducting, is ground and mixed with an electronically conducting polymer such as poly(anylene). The composite membrane formed can conduct both protons and electrons.

Example 11

An solid acid silicate of general formula $M_aH_bSiO_4$ such as $CaNaHSiO_4$, $Cs_3HSiO_4$ or $(NH_4)_3HSiO_4$, is ground and mixed with an electronically conducting polymer such as poly(anilene). The composite membrane formed can conduct both protons and electrons.

Example 12

A proton conducting solid acid, such as $CsHSO_4$, $Cs_2(HSO_4)(H_2PO_4)$, $(NH_4)_3H(SO_4)_2$ or $CaNaHSiO_4$, and a metal, such as Ag, Au, or Cu, are ground and mixed. The mixed powders are compressed by hot-pressing. The composite membrane formed can conduct both protons and electrons, and may be stable to higher temperatures than a composite in which the electron conducting component is a polymer.

Example 13

A proton conducting solid acid, such as $CsHSO_4$, $Cs_2(HSO_4)(H_2PO_4)$, $(NH_4)_3H(SO_4)_2$ or $CaNaHSiO_4$, and a metal, such as Ag, Au, or Cu, are ground and mixed. A polymeric material is also added. A solid composite membrane is prepared either by hot-pressing, if the polymer is melt-processable such as poly(vinylidene fluoride), or by in situ polymerization, if the polymer is in situ polymerizable such as poly(dicyclopentadiene). The composite membrane is both proton and electron conducting, and may have superior mechanical properties to a composite containing only a solid acid and a metal.

Example 14

A mixed electron and proton conducting solid acid, such as $CsHCr_xS_{1-x}O_4$ or $(NH_4)_3H(Cr_xS_{1-x}O_4)_2$ in which one of the X elements has a variable valence, is mixed with an inert polymeric binder. If the polymer is melt-processable, such as poly(vinylidene fluoride), a membrane is formed by hot-pressing. If the polymer can be polymerized in situ, a membrane is formed by mixing the solid acid, the monomer and the polymerization catalyst. The resulting membrane conducts both protons and electrons, and may be more stable in oxidizing atmospheres than a composite containing metal particles.

Example 15

A Cs or $NH_4$ based solid acid, such as $CsHSO_4$, $Cs_2(HSO_4)(H_2PO_4)$, $Cs_5H_3(SO_4)_4 \cdot xH_2O$ or $(NH_4)_3H(SO_4)_2$ is prepared from aqueous solution, ground, and then pressed into a thin membrane. The membrane is used in an electrochemical device at a temperature above the superprotonic transition temperature and above 100° C., so that the proton conductivity of the solid acid is high and any $H_2O$ that may be present in the device exists in the form of steam rather than liquid water.

Example 16

A mixed electron and proton conducting solid acid, such as $CsHCr_xS_{1-x}O_4$ or $(NH_4)_3H(Cr_xS_{1-x}O_4)_2$ in which one of the X elements has a variable valence, is prepared from aqueous solution or by solid state reaction. The powder is then ground and pressed into a thin membrane. The membrane is used in an electrochemical device at a temperature above the superprotonic transition temperature and above 100° C., so that the conductivity of the solid acid is high and any $H_2O$ that may be present in the device exists in the form of steam rather than liquid water.

Example 17

A composite comprised of one or more of the solid acids listed in Table 1 and one or more of inert binders listed in Table 2. If one or more of the components in the composite is electronically conducting, the composite membrane will be capable of conducting both protons and electrons. Electronically conducting substances are indicated.

TABLE 1

Solid acid compounds.

| Sulfates and sulfate-phosphates | selenates and selenate phosphates | silicates |
|---|---|---|
| $CsHSO_4$ | $CsHSeO_4$ | $CaNaHSiO_4$ |
| $Cs_3H(SO_4)_2$ | $Cs_3H(SeO_4)_2$ | $CaH_2SiO_4$ |
| $Cs_5H_3(SO_4)_4 \cdot xH_2O$ | $Cs_5H_3(SeO_4)_4 \cdot xH_2O$ | $CsH_3SiO_4$ |
| $Cs_3(HSO_4)_2(H_{1.5}(S_{0.5}P_{0.5})O_4)$ | $Cs_3(HSeO_4)_2(H_{1.5}(Se_{0.5}P_{0.5})O_4)$ | $Cs_2H_2SiO_4$ |
| $Cs_3(HSO_4)_2(H_2PO_4)$ | $Cs_3(HSeO_4)_2(H_2PO_4)$ | $Cs_3HSiO_4$ |
| $Cs_2(HSO_4)(H_2PO_4)$ | $Cs_2(HSeO_4)(H_2PO_4)$ | $NH_4H_3SiO_4$ |
| $Cs_5(HSO_4)_3(H_2PO_4)_2$ | $Cs_5(HSeO_4)_3(H_2PO_4)_2$ | $(NH_4)_2H_2SiO_4$ |
| $CsH_2PO_4$ |  | $(NH_4)_3HSiO_4$ |
| $NH_4HSO_4$ | $NH_4HSeO_4$ | $RbH_3SiO_4$ |
| $(NH_4)_3H(SO_4)_2$ | $(NH_4)_3H(SeO_4)_2$ | $Rb_2H_2SiO_4$ |
| $(NH_4)_5H_3(SO_4)_4 \cdot xH_2O$ | $(NH_4)_5H_3(SeO_4)_4 \cdot xH_2O$ | $Rb_3HSiO_4$ |
| $(NH_4)_2(HSO_4)(H_2PO_4)$ | $(NH_4)_2(HSeO_4)(H_2PO_4)$ | $KH_3SiO_4$ |
| $(NH_4)H_2PO_4$ |  | $K_2H_2SiO_4$ |
| $RbHSO_4$ | $RbHSeO_4$ | $K_3HSiO_4$ |
| $Rb_3H(SO_4)_2$ | $Rb_3H(SeO_4)_2$ | $NaH_3SiO_4$ |
| $Rb_5H_3(SO_4)_4 \cdot xH_2O$ | $Rb_5H_3(SeO_4)_4 \cdot xH_2O$ | $Na_2H_2SiO_4$ |
| $Rb_2(HSO_4)(H_2PO_4)$ | $Rb_2(HSeO_4)(H_2PO_4)$ | $Na_3HSiO_4$ |
| $RbH_2PO_4$ |  | $BaCsHSiO_4$ |

TABLE 2

Binder or matrix materials

| Polymer | ceramic/oxide glass | metal or semiconductor |
|---|---|---|
| poly(vinylidene fluoride) | $SiO_2$ | Ag* |
| poly(dicyclopentadiene) | $Al_2O_3$ | Au* |
| poly(tetrafluoroethelyne) [Teflon] | MgO | Cu* |
| poly(ether-ether ketone) | cordierite | Al* |
| poly(ether sulfone) |  | Ni* |
| Silicones [dimethyl siloxane polymers] |  | Fe* |
| poly(pyrrole)* |  | Zn* |
| poly(aniline)* |  | graphite* |
|  |  | silicon* |

*electronically conducting

Other modifications are within the disclosed embodiment. For example, the above has described the materials having a superprotonic transition upon heating. Certain materials may have their superprotonic transition temperature below room temperature. Thus, there may be no apparent superprotonic transition and the material would be disordered at room temperature. These solid acids with structural disorder even prior to heating are also contemplated.

What is claimed is:

1. A proton conducting membrane, formed of a solid acid material which is of a type that transports H+ ions in a solid phase, said membrane having a structure that can be used in an aqueous environment, wherein said solid acid is $Cs_2Na(HSO_4)_3$.

2. A proton conducting membrane, formed of a solid acid material which is of a type that transports H+ ions in a solid phase, said membrane having a structure that can be used in an aqueous environment, wherein said solid acid is $CaNaHSiO_4$.

3. A proton conducting membrane comprising:

a solid acid material which includes the chemical form $M_aH_b(XO_t)_c$, where a, b, c and t are non-zero integers and the structure has $XO_t$ groups linked together by hydrogen bonds; and a strucural binder with said solid acid material wherein said structural binder is electrically conducting.

4. A membrane as in claim 3 wherein said conducting material is a conducting polymer.

5. A membrane as in claim 3 wherein said conducting material is a metal.

6. A membrane as in claim 5 wherein said metal is mixed with a polymer.

7. A membrane as in claim 3 wherein said conductor is formed by direct chemical substitution with variable valence ions.

8. A membrane as in claim 4 wherein said solid acid material is processed to include variable valence elements.

9. A proton conducting membrane, comprising:

a solid acid material which includes the chemical form $Cs_aH_b(SiO_t)_c$, where a, b, c and t are non-zero integers and the structure has $SiO_t$ groups linked together by hydrogen bonds; and a structural binder for said solid acid material, forming a membrane with said solid acid material.

10. A proton conducting membrane, comprising:

a solid acid material which includes the chemical form $M_aH_b(XO_t)_c$, where a, b, c and t are non-zero integers and the structure has $XO_t$ groups linked together by hydrogen bonds; and a structural binder for said solid acid material, forming a membrane with said solid acid material wherein said solid acid is of the general formula $M_aH_b(XO_t)_c$, where;

the X material is from the group consisting of Si, P, S, As, Se, or Te wherein M is Cs, and wherein said solid acid material is water insoluble.

11. A proton conducting membrane, comprising;

a solid acid silicate which is one of $CaNaHSiO_4$, $Cs_3HSiO_4$ or $(NH_4)_{3HSiO4}$.

* * * * *